April 22, 1930.　　　S. J. NORDSTROM　　　1,755,406
VALVE
Filed Aug. 7, 1928
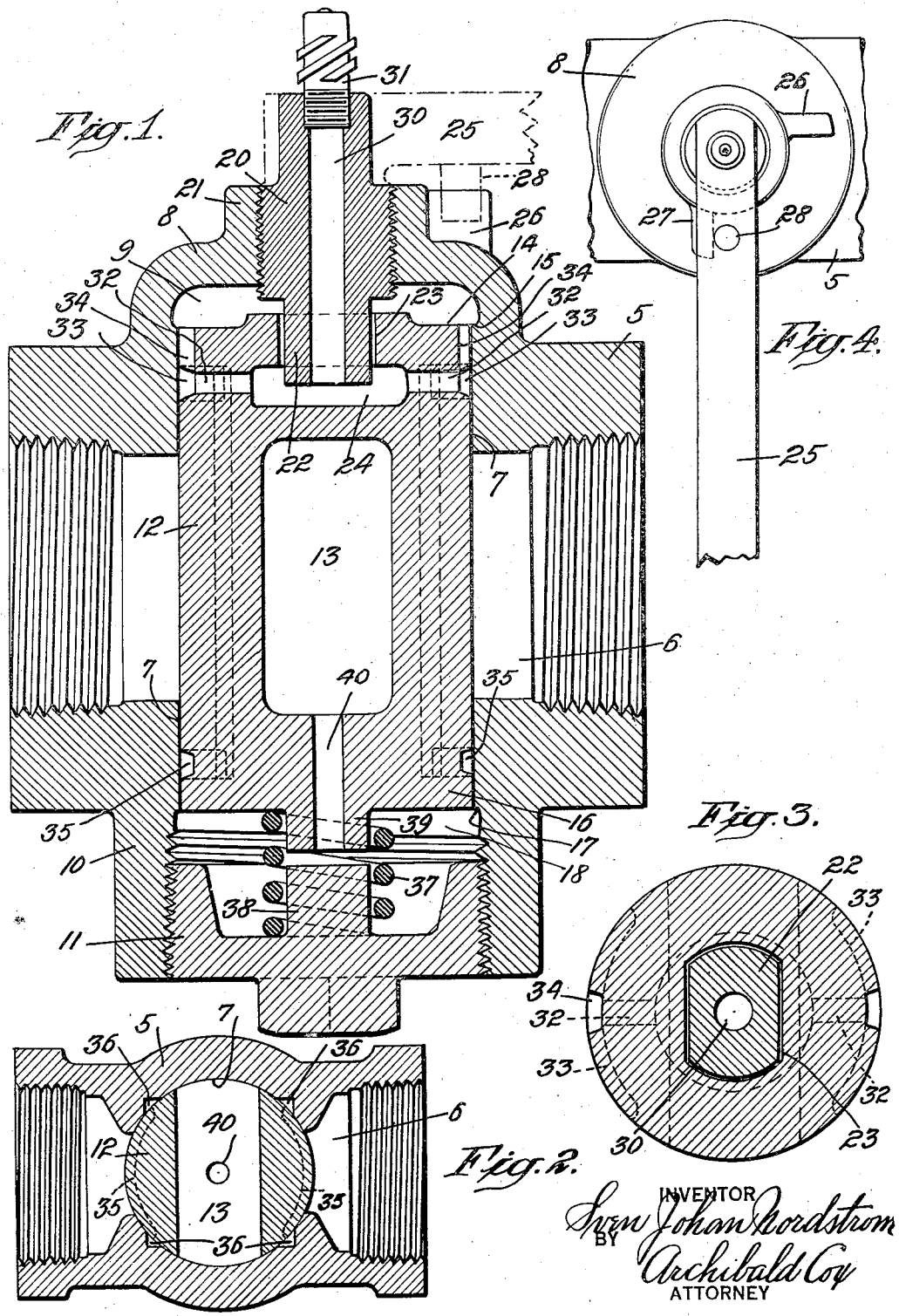

Patented Apr. 22, 1930

1,755,406

UNITED STATES PATENT OFFICE

SVEN JOHAN NORDSTROM, OF OAKLAND, CALIFORNIA

VALVE

Application filed August 7, 1928. Serial No. 297,937.

The invention relates to an improvement in valves, and more particularly to an improvement in cylindrical plug valves.

It has been proposed heretofore to lubricate automatically the bearing or seating surfaces of the cylindrical plug and the cylindrical seat in the casing by utilizing the pressure of the fluid passing through the valve. This means of lubricating cylindrical plug valves has not proved entirely satisfactory for either low pressure service or high pressure service. When such valves are used in low pressure service, as for example on pipe lines for conducting low pressure gas, the pressure of the gas is not sufficient to counter-balance the weight of the plug and overcome the friction of the bearing surfaces of the plug and the casing and at the same time maintain an effective pressure on the lubricant. When these valves are used in high pressure service, the pressures are frequently sufficiently great to force all the lubricant in a short space of time into the line, leaving the bearing surfaces of the plug and casing devoid of lubricant.

One object of the present invention is to secure effective and automatic lubrication of the seating or bearing surfaces of cylindrical plug valves by means exerting greater force than and acting independently of the pressure of the fluid passing through the valve. Another object of the invention is to arrange the parts of a cylindrical plug valve in such a way that the pressure of the fluid passing through the valve will not move the plug axially in either direction, but will on the contrary maintain the plug in a balanced condition. A further object of the invention is to provide a lubricated cylindrical plug valve with means for effectively lubricating the seating and bearing surfaces of the valve for long periods of time without attention. To these ends and others which will appear as the description proceeds the invention consists in the improved cylindrical plug valve hereinafter described and particularly pointed out in the appended claims.

In the accompanying drawings illustrating the preferred form of the invention, Fig. 1 is a longitudinal section through the improved cylindrical plug valve, with the plug shown in closed position; Fig. 2 is a horizontal section, on a reduced scale, through the middle of the valve as shown in Fig. 1; Fig. 3 is a transverse section through the upper end of the cylindrical plug; and Fig. 4 is a partial top plan of the valve shown in Fig. 1.

The improved valve as illustrated in the drawings comprises a casing 5 having a longitudinal passageway 6 therethrough and a cylindrical bore or seat 7 formed transversely of the passageway 6. At its upper side 8 the casing 5 is closed and forms a chamber 9 into which the upper end of the cylindrical seat 7 opens. At its lower side the casing 5 is open and is formed as an annular, internally threaded flange 10 which extends downwardly beyond the lower end of the cylindrical seat 7 and is closed by a pipe plug 11. Seated loosely in the seat 7 in the casing 5 is a cylindrical plug 12 provided with a hole 13 adapted to register with the passageway 6 through the casing when the valve is open. The plug 12 is supported by a coiled spring 37 interposed between the upper side of the pipe plug 11 and the lower end of the plug 12. The lower end of the spring loosely encircles a guide boss 38 projecting upwardly from the pipe plug 11, and the upper end of the spring loosely encircles a guide boss 39 extending downwardly from the lower end of the plug 12. In the position shown in Fig. 1, the upper end 14 of the plug 12 terminates substantially flush with the upper end 15 of the seat 7 and constitutes the lower side of the chamber 9 of which the part 8 of the casing constitutes the upper side. While in this position the lower end 16 of the plug 12 terminates substantially flush with the lower end 17 of the seat 7, leaving the space 18 between the lower cylindrical end of the plug 12 and the upper side of the pipe plug 11. Under the conditions of operation, as hereinafter described, the cylindrical plug 12 may move upwardly into the chamber 9 and downwardly into the chamber 18.

The plug 12 is turned by means of a head 20 threaded (by a right hand thread) into the central boss 21 formed in the side 8 of the casing. The lower end 22 of the head 20 is flattened, as shown in Fig. 1, and enters loosely a correspondingly shaped hole 23 in the upper end of the plug 12. The lower extremity of the part 22 of the head 20 extends into a space 24 formed in the upper end of the plug 12. The head 20 is turned by means of a handle 25 which may be formed integrally therewith. In order that the plug 12 may not be turned through a greater arc than 90° from open to closed position and vice versa, the part 8 of the casing 5 is provided with two stops 26 and 27 and the handle 25 is provided with a lug 28.

The cylindrical bearing or seating surfaces of the plug 12 and the seat 7 are automatically pressure lubricated by the following means:—The head 20 is provided with an axial bore 30 the lower end of which opens into the space 24 in the plug 12 and the upper end of which is provided with a fitting 31 for the attachment of a lubricant compressor (not shown), both the fitting 31 and the compressor being of usual construction. The space 24 in the plug 12 opens through the two radial holes 32 into the two oppositely disposed, transverse or arcuate grooves 33 formed in the upper end of the plug 12. The grooves 33 communicate by the longitudinal grooves 34 with the chamber 9. In the lower end of the plug 12 are two oppositely disposed arcuate grooves 35 located in alinement with and of substantially the same size as the arcuate grooves 33 in the upper end of the plug. In the cylindrical seat 7 in the casing 5 are formed four longitudinal grooves 36 extending from the upper edges of the arcuate grooves 33 to the lower edges of the arcuate grooves 35. The longitudinal grooves 36 are spaced substantially equidistant apart in the cylindrical seat 7, and the arcuate grooves 33 and 35 are of such length that when the plug 12 is in either open position, or in closed position, as shown in Fig. 2, both pairs of arcuate grooves span two adjacent longitudinal grooves. In other positions of the plug 12 the two arcuate grooves on one side of the plug are in communication with one longitudinal groove and the two arcuate grooves on the other side of the plug are in communication with a diametrically opposed longitudinal groove, as will clearly appear from a consideration of Fig. 2. Thus there is always a free passage of lubricant from the upper arcuate grooves 33 down into the lower arcuate grooves 35.

When lubricant is inserted under pressure into the valve through the fitting 31 by means of a compressor, the lubricant passes through the bore 30 and into the space 24, thence it passes through the radial holes 32 into the arcuate grooves 33 and at the same time through the short longitudinal grooves 34 into the chamber 9. As the arcuate grooves 33 are filling with lubricant, or when they have been filled, depending upon the position of the plug 12, the lubricant passes down through two or more of the longitudinal grooves 36 and into the arcuate grooves 35. When these spaces, which may be termed the lubricating system of the valve, have been filled with lubricant, continued insertion of lubricant into the valve causes the plug 12 to move axially downward against the action of the spring 37. Sufficient lubricant is inserted into the valve to bring the boss 39 into contact with the boss 38. While the spring 37 is being compressed and the plug 12 is moving axially downward, lubricant is escaping from the arcuate grooves 33 and 35 and from the longitudinal grooves 36 and filling the space between the cylindrical plug 12 and the cylindrical seat 7 in the casing.

When the lubricating system of the valve has thus been charged with lubricant, the valve is in condition for long continued use without recharging with lubricant. As the plug 12 is turned to open and close the valve, thereby dissipating the lubricant between the cylindrical surface of the plug 12 and the cylindrical seat 7, fresh lubricant is introduced into the space between the plug 12 and the seat 7 from the chamber 9 by the upward axial movement of the plug 12 under the action of the spring 37. In this connection it will be observed, that since the fluid passing through the valve exerts a balanced pressure in all directions upon the plug 12, the spring 37 need only be strong enough to counterbalance the weight of the plug 12, overcome the frictional engagement between the plug 12 and the seat 7 and force the lubricant in the chamber 9 through the grooves and into the space between the plug 12 and the seat 7. The strength of the spring 37 has no relation to the pressure of the fluid passing through the valve and hence the same spring is suitable for whatever service the valve is used, whether low or high pressure service. It will be understood of course that the strength of the spring should be limited to its ability to effect proper lubrication of the cylindrical surfaces of the plug and the seat 7 without forcing an excess of lubricant into the line.

The improved cylindrical plug valve of the present invention has the following advantages in addition to those described above: (*i*) Each time the plug is turned from closed to open position or vice versa the plug is caused to move axially in its seat. Since the head 20 is provided with a right hand thread, the lower end of the head will move into the chamber 9 as the plug is turned from open to closed position, thereby compressing the lubricant in the chamber 9 and causing the plug 12 to travel downward axially and compress the spring 37. When the plug is turned in the reverse direction from closed to open position, the head 20 will move outwardly from the chamber 9 and leave a space, thereby permitting the spring 37 to move the plug 12 axially upward to compress the lubricant and close the space in the chamber 9. This axial movement of the plug 12 in its seat 7 aids in keeping the lubricant on them uniformly distributed. It also facilitates a uniform escape of the lubricant from the arcuate and longitudinal grooves into the space between the plug 12 and the seat 7. (ii) It will be noted that when the valve is closed, with the plug in the position shown in Figs. 1 and 2, both ends of the port through the valve are surrounded by a continuous groove filled with lubricant under greater pressure than the pressure of the fluid in the line. Consequently there can be no leakage past the plug when it is in closed position. (iii) It will also be noted that with the novel arrangement of parts described above, it is not necessary to provide the valve of the present invention with packing to prevent escape of the fluid in the line to the atmosphere. The pipe plug 11 seals the casing at one side and the lubricant in the chamber 9 being under greater pressure than the fluid in the line acts as an effective seal at the other side. In order that there may be no difficulty from lubricant accumulating in the chamber 18, I provide a way of escape into the line by means of the hole 40 formed axially in the lower part of the plug 12.

Having thus described the invention, what I claim as new is:—

1. A valve comprising, a casing having a passageway therethrough and a cylindrical seat formed transversely of the passageway, a cylindrical plug loosely mounted in the seat and having a hole adapted to register with the passageway, said plug being substantially as long as the cylindrical seat in the casing, the lower side of said casing being closed and forming a chamber with the lower end of the plug, a spring interposed between the plug and the lower side of the casing for supporting the plug, the upper side of the casing being closed and forming a chamber with the upper end of the plug, a head threaded into the upper side of the casing, the lower extremity of the head being flattened and loosely engaging with a correspondingly shaped opening in the upper end of the plug to turn the plug when the head is turned, said head having a bore therethrough and being provided at the outer end of the bore with a fitting for the attachment of a lubricant compressor thereto, the upper end of the plug having passageways by which the inner end of the bore in the head communicates with the chamber in the upper side of the casing, and the seating surfaces of the cylindrical plug and the cylindrical seat in the casing being provided with grooves in communication with the interior of the head and the chamber in the upper side of the casing.

2. A valve comprising, a casing having a passageway therethrough and a vertically arranged cylindrical seat formed transversely in the passageway, a cylindrical plug loosely mounted in the seat and having a hole adapted to register with the passageway, means for resiliently supporting the plug, the upper side of the casing forming a chamber with the upper end of the plug and sealing the plug from the atmosphere, means for turning the plug, means whereby lubricant under pressure may be introduced into the chamber to act against the plug and compress the yielding plug holding means, and the seating surface of the cylindrical plug and the seat being provided with grooves communicating with the chamber.

3. A valve comprising, a casing having a passageway therethrough and a vertically arranged cylindrical seat formed transversely of the passageway, a cylindrical plug loosely mounted in the seat and having a hole adapted to register with the passageway, means for yieldingly supporting the plug, the upper side of the casing forming a chamber with the upper end of the plug, a head threaded into the upper side of the casing and having a flattened part loosely engaging a correspondingly shaped part of the upper end of the plug whereby the plug may be turned, means whereby lubricant under pressure may be inserted into the chamber to act against the plug to compress the yielding plug holding means, and the seating surfaces of the plug and the seat being provided with grooves communicating with the chamber.

4. A valve comprising, a casing having a passageway therethrough and a cylindrical seat formed transversely of the passageway, said casing being closed at its two sides opposite the ends of the cylindrical seat, a cylindical plug mounted loosely in the seat and having a hole adapted to register with the passageway, each end of the plug being spaced from the adjacent side of the casing, a spring interposed between one end of the plug and the adjacent side of the casing, a head threaded into the other side of the casing and having a turning engagement with the other end of the plug, the seating surfaces of the cylindrical plug and the cylindrical seat being provided with grooves, and means whereby the spaces between the plug and the casing may be filled with lubricant.

5. A valve comprising, a casing having a fluid passageway therethrough and a cylindrical bore formed transversely of the passageway, a cylindrical plug rotatably positioned in the bore for controlling the passageway and adapted to move axially in both directions in the bore, the casing being closed at both ends of the bore to seal the plug from the atmosphere so that the fluid pressure in the casing tends to maintain the plug in balanced condition, means for introducing lubricant into the casing at one end of the bore, resilient means acting axially on the plug to force it against the lubricant, and means for turning the plug.

6. A valve comprising, a casing having a fluid passageway, a plug mounted in the casing for rotative and sliding movements therein, said plug being spaced at each end from the adjacent side of the casing and being sealed from the atmosphere so that the fluid pressure within the casing tends to maintain the plug in balanced condition, means for introducing lubricant into the space at one end of the plug, resilient means acting on the other end of the plug to force it against the lubricant, and means for turning the plug.

7. In a valve comprising, a casing having a fluid passageway and a plug rotatably and slidingly mounted in the casing, the casing closing the plug from the atmosphere so that the fluid pressure in the casing tends to maintain the plug in balanced condition, means for presenting a mass of lubricant to one end of the plug, and resilient means acting on the plug to force it against the lubricant.

8. In a valve comprising, a casing having a fluid passageway and a plug rotatably and slidingly mounted in the casing, the casing closing the plug from the atmosphere so that the fluid pressure in the casing tends to maintain the plug in balanced condition, means for presenting a mass of lubricant to one end of the plug, and means for forcing the plug against the lubricant.

9. A valve comprising, a casing having a fluid passageway, a plug rotatably and slidingly mounted in the casing for controlling the passageway, resilient means acting on the plug for moving it axially in one direction, the casing sealing the plug from the atmosphere so that the fluid pressure in the casing acts equally in opposite directions axially on the plug, a chamber containing lubricant exposed to one end of the plug, the resilient means acting on the plug to force it against the lubricant, and means for turning the plug.

10. A valve comprising a casing having a passageway therethrough for the flow of fluid and a bore formed transversely of the passageway, a plug rotatably positioned within the bore for controlling the passageway and adapted for axial sliding movement in the bore relative to the casing, the casing being closed at both ends of the bore so that the fluid pressure in the casing acts on both end portions of the plug, the plug presenting substantially equal effective opposed fluid pressure areas, means for introducing a charge of lubricant into the valve at one end of the plug, and means for expelling said lubricant to the coacting surfaces of the valve including means for forcing the plug towards said lubricant chamber.

11. A valve comprising, a casing having a passageway therethrough for flow of fluid and a cylindrical bore formed transversely of the passageway, a cylindrical plug rotatably positioned within the bore for controlling the passageway and adapted for axial sliding movement in the bore relative to the casing, the casing being closed at both ends of the bore so that the fluid pressure in the casing acts on both ends of the plug, the plug presenting substantially equal effective opposed fluid pressure areas, means for introducing lubricant into the bore at one end of the plug, and means for expelling lubricant from said chamber to the coacting surfaces of the valve including means for forcing the plug towards said lubricant chamber.

12. A valve comprising, a casing having a fluid passageway therethrough and a cylindrical bore formed transversely of the passageway, a cylindrical plug rotatably positioned in the bore for controlling the passageway and adapted to move axially in both directions in the bore, the side of the casing at one end of the bore being closed, resilient means interposed between this side of the casing and the adjacent end of the plug to move the plug axially, a head rotatably mounted in the side of the casing at the other end of the bore and serving to close the casing whereby the plug is sealed from the atmosphere, said head having a driving connection with the adjacent end of the plug, and means whereby lubricant under pressure is introduced into the casing to act on the plug to move it against the resilient means.

SVEN JOHAN NORDSTROM.

CERTIFICATE OF CORRECTION.

Patent No. 1,755,406.  Granted April 22, 1930, to

SVEN JOHAN NORDSTROM.

It is hereby certified that the above numbered patent was erroneously issued to the inventor said "Nordstrom", whereas said patent should have been issued to "Merco Nordstrom Valve Company, of San Francisco, California, a corporation of Delaware", said corporation being assignee of the entire interest in said invention, as shown by the records of assignments in this office; and that the said Letters Patent should be read with this correction therein that the same may conform to the record of the case in the Patent Office.

Signed and sealed this 20th day of May, A. D. 1930.

(Seal)

M. J. Moore,
Acting Commissioner of Patents.